Feb. 2, 1971          V. A. GOOD          3,559,340
                     CHEMICAL AXE
                   Filed July 11, 1968
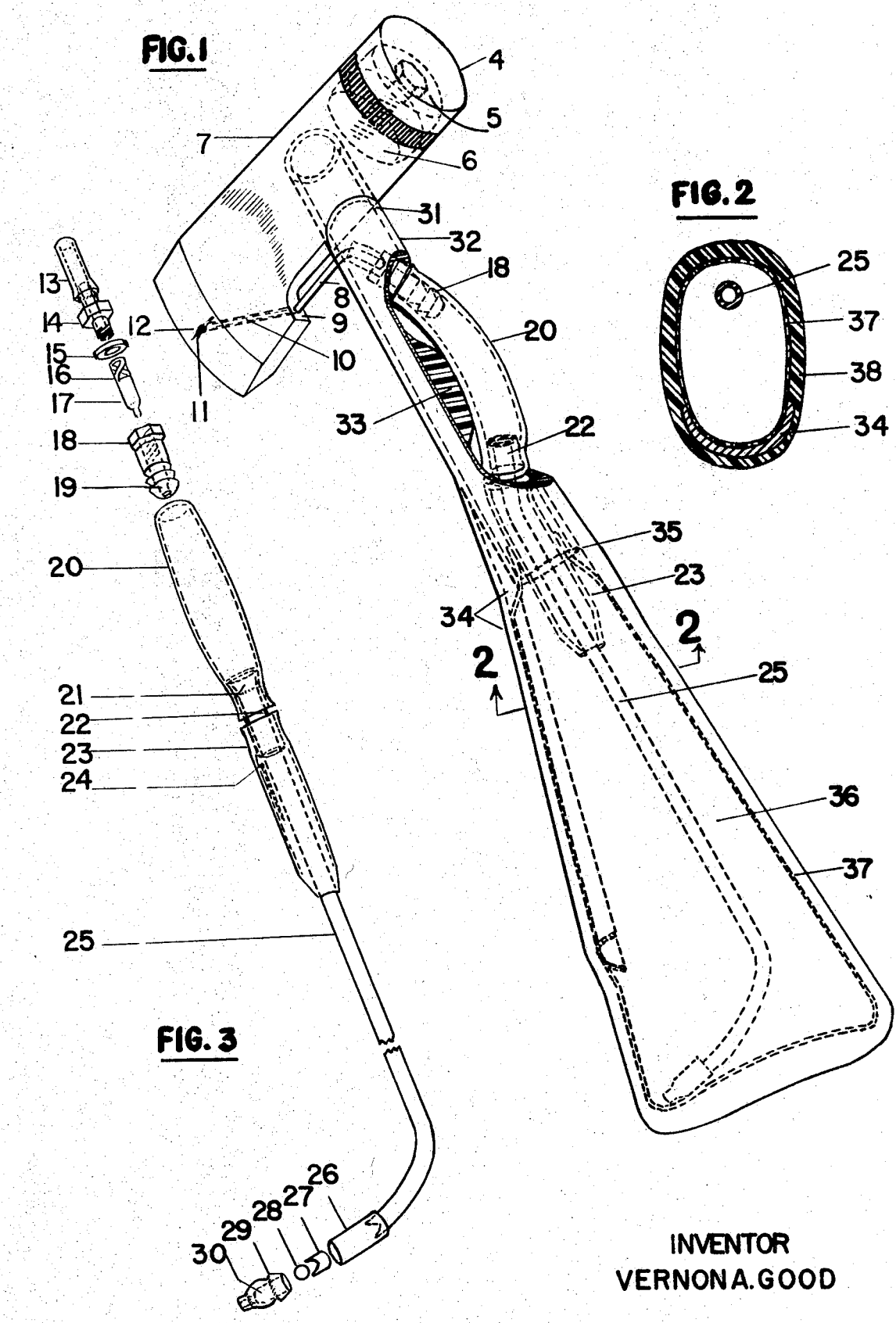
INVENTOR
VERNON A. GOOD

United States Patent Office 3,559,340
Patented Feb. 2, 1971

3,559,340
CHEMICAL AXE
Vernon A. Good, 1925 NE. Liberty St.,
Portland, Oreg. 97211
Filed July 11, 1968, Ser. No. 744,156
Int. Cl. B26b 23/00; A01g 29/00
U.S. Cl. 47—57.5                                     3 Claims

ABSTRACT OF THE DISCLOSURE

A chemical axe containing a supply of fluid and having means whereby fluid can be injected into a tree after the axe blade is imbedded into the tree.

---

This invention provides a tool in the category of an injection axe intended for use in injecting chemicals under the bark of trees and shrubs. This device when compared to other injection devices in the form of axes or spears provides improved balance; control of the amount and timing of fluid release with each individual injection; freedom from encumbering feeder hose; especial provision for corrosion resistance; simplicity of cleaning and maintenance; wde versatility in the size, character, and distribution of woody stems that can be treated; and freedom from operator fatigue in use.

Upon sinking the axe blade through the bark of a tree or woody shrub it is possible when using this device to deposit as much or as little fluid in the axe cut as is desired with a minimum of effort and loss of time by simply pivoting the thumb onto the ejection bulb.

The preferred embodiment utilizes a uniquely shaped head with no moving parts. A cap on top of the cylindrical head can be unscrewed to accommodate insertion of additional weight when desired, or to accommodate other screw-on fittings as may be desired. The blade is especially modified by an exaggerated overhang behind the head on the underside of the handle to protect, accept, and contain a small diameter stationary tubing insert of non-corrodible material which enters the top of the blade overhang and extends diagonally inside the blade, for the purpose of feeding fluid to outlet orifices exiting on both sides of the blade near the center of the blade just above the cutting edge.

As the axe is viewed from the side a handle is fitted into the head perpendicular to the vertical axis of the head in the usual manner. However, the handle is uniquely designed to be grasped at mid-length, and modified in shape along the narrow forepart to accommodate and protect a removable lightweight self-contained hydraulic pump system which can be actuated by manual pressure on a bulb at the will of the operator. The rear of the handle is hollow, tapering from a narrow neck downward and outward gradually toward the rear, forming a closed-end reservoir of oval cross section to hold fluids. At the point of juncture between the narrow forepart of the handle and the reservoir an underside extension of concave forms serves as a reinforcing support to the reservoir. However, in the preferred embodiment these parts are unitized by brazing and fibre-glassing into a single component. In the preferred embodiment this reservoir is formed of fibre-glass and has a plastic liner, both of which provide translucency so that the fluid level may be visually observed. The gripping portion of the handle is formed as a tapered hollow oval for gripping with either one or two hands while providing the reservoir within.

An important feature of the chemical axe is the introduction of an especially designed light weight hydraulic pump system, of plastics and rubber, which is removable as a unit for cleaning. The preferred embodiment has a sealing sleeve of tubular rubber mounted ahead of the pump intake line, and as the intake is inserted through the reservoir neck the sealing sleeve closes the reservoir. The fore-end of the pump unit is then connected by slipping its flexible plastic nipple over the stationary inlet tubing end located near the front of the handle, and which inlet tubing feeds fluid into the axe head. The actuating bulb of the pump system nestles along the top of the handle just in front of mid-handle, conveniently located for thumb pressure, yet protected from extraneous bumping.

In contrast to some other previously designed devices, this injection axe has been purposely designed so that it does not eject or pump fluid by inertial impact, and can be used to cut limbs or chop through bark without triggering fluid release.

In use the operator fills the reservoir at the neck from a separate container, inserts the pump intake end into the reservoir and pushes the pump fore-nipple in place, then primes the actuating bulb with a few squeezes. Once the bulb is full of fluid, and fluid ejects from the orifices of the axe blade, the tool is ready for use. Thereafter the bulb remains full of fluid, automatically refilling as thumb pressure is released after each discharge.

After choosing the woody stem to be treated and doing any preliminary chopping or limbing the operator sinks the blade through the bark of a chosen woody stem at a point below waist level with a short easy rocking blow with elbow at side, while grasping the axe at mid-handle. When the operator is satisfied with the position and depth of the axe cut (and only then) thumb pressure may be applied to the actuating bulb semi-automatically without shifting the hand from the gripping point, and fluid is instantly released. The amount of fluid discharged in the cut is at the discretion of the operator. Quantities can range from a few drops to enough to fill the cut, depending upon the amount of pressure, and number of times pressure is manually applied to the hydraulic actuating bulb. This amount may be easily judged since the open cut and blade orifice can be readily viewed.

Reference to the accompanying drawing illustrating the preferred embodiment of the chemical injection axe will make clear the specific function, design and relationships of the component parts.

FIG. 1 is a perspective view of this invention, showing also the interior position of the pump system within the reservoir and internal features of the head;

FIG. 2 is a cross section of the reservoir taken along line 2—2 of FIG. 1;

FIG. 3 is an exploded view of the removable pump unit.

Referring to FIG. 1, the head of the axe is unique in its design, being fitted with a stationary tubing 8 of non-corrodible material extending downward through a shelf-like protrusion 9 of the blade from the back side of the head at a point just below the point of perpendicular axial entrance of the handle into the head, thence extending diagonally within the blade through an injection bore 10 to a point midway across the length of the blade, but close to the cutting edge, at which point it joins with a small diameter cross bore or orifice 11 outletting both ways to the outside of the bit. At the outlets of the orifice 11, the blade is grooved or indented at 12 in a direction perpendicular to the center of the arc of the cutting edge, and along the plane of taper of the cutting edge of the axe blade for the purpose of releasing pressure from an axe blow against any small amount of fluid that may cling to the cutting edge of the blade, thus reducing any tendency for fluid remaining on the blade to splatter with the blow.

The head has a cylindrical portion 7 fitted with a removable screw-on cap 4 fitted in such a way that additional weight may be inserted in the cavity 6 of the head if desired, or weight in the form of one or more washers may be provided between the cap and portion 7. This feature makes it possible to use the axe in its lightest condition where bark is thin, but additional weight can be inserted when needed to provde penetration of thicker barked stems.

The forepart 32 of the handle not only accommodates the front connecting point for the pump flexible nipple 13 with the stationary tubing 8, but also carries a cradle 33 upon which the actuating bulb 20 of the pump system rests. A concave extension 34 of the forepart 32 is shown in FIGS. 2 and 3 and forms an undersupport for the reservoir 36. The forepart of the reservoir itself provides the gripping point of the handle. In the preferred embodiment, the forepart of the handle is of tubular stainless steel. It is possible, in an economy model version of my axe to form the forepart 32 and its extension 34 of wood. In such case, there would be no separate cradle 33 and instead the wood would be formed to provide the cradle.

The reservoir 36 is filled from another container at its forepoint when the pump system is removed as a unit, which removal can be accomplished by simply pulling forward on the pump system after detaching the front nipple 13. FIG. 2 is a cross sectional view of the preferred embodiment of the reservoir showing a plastic lining 37, a fibre glass outer wrap 38 and the concave support 34.

Referring to FIGS. 1 and 3, a flexible plastic nipple 13 forms the front of the removable pump system. This nipple fits snugly on a reducer formed as the fore-end of the housing insert fitting 14, and provides a means of easily connecting and disconnecting the front of the removable pump system with the small diameter stationary tubing 8 awaiting at the forepart of the handle 32. The housing insert fitting 14 forms a seal with its housing 18 by means of screwing tightly against a plastic washer 15.

The actuating bulb 20 is flexible plastic and depends for its front seal on the ridged design of the shut-off valve housing 18, over which it is stretched. The rear seal of the actuating bulb is accomplished by means of an inner sleeve 22 of tubular rubber forced outward by pulling backward a tapering collar 21 of plastic mounted on the front flared end of the intake line 25. During assembly, as the intake line 25 is pulled backward, the inner sleeve 22 is expanded firmly in diameter against the inner wall of the actuating bulb 20. The pump system seal is completed when an outer sealing sleeve 23 of rubber of larger diameter is then slipped forward over the back portion of the inner sleeve 22. The outer sealing sleeve completes the seal between the pump system and the reservoir neck 35 when it is inserted rearward into the reservoir with the accompanying intake line 25 and entire intake valve assembly 26, 27, 28, 29 and 30.

An air vent tube 24 of extremely small diameter plastic is inserted into the top of the sealing sleeve 23; so that when the sealing sleeve is mounted into the reservoir neck 35 to seal the reservoir, air lock is prevented.

At the end of the intake line 25 the pump system employs a flexible shut-off valve 17 enclosed in the housing 18 inserted into the front end of the actuating bulb 20, and an intake valve 28, located in a housing 29 which rests at the bottom of the reservoir 36. The flexible shut-off valve 17 remains pushed closed against a seat 19 by a non-corrodible spring 16 except when opposing pressure is exerted on the actuating bulb 20. The housing 18 not only encloses the shut-off valve 17, but may be opened for cleaning without removing the pump component (FIG. 3), simply by unscrewing the male insert fitting 14 at the fore-end of the housing 18 using the fingers in a twisting motion.

In operation, when the actuating bulb 20 is squeezed, an intake valve 28 in the housing 29 clasped by sleeve 26 at the foot of the pump intake 25 and resting close to the bottom of the reservoir 36 closes. The same pressure simultaneously forces the shut-off valve 17 open in a forward direction instantly discharging the desired small quantity of fluid into the connecting nipple 13, thence forward through the statonary tubing 8 extending through the axe blade 9 and is dispelled through the outlets of the orifice 11 on both sides of the blade into the axe cut under the bark of the treated woody stem.

Upon releasing thumb pressure, the shut-off valve 17 closes against the seat 19 in the housing 18; the intake ball valve 28 at the foot of the pump floats free from its housing 29, against the spacer 27, and the bulb 20 sucks a new supply of fluid through the supply line 25 into the actuating bulb 20 ready for the next squeeze.

It is the object of the device to provide a more efficient means than now exists to apply the correct amount of chemical within axe cuts on woody stems under a variety of diameter and bark thickness circumstances and to eject fluid only when desired after limbing and hacking operations without ejection. It is then possible to convert the action to an injecting action by thumb squeeze.

Another object in design has been to provide a lightweight, fatigue free device, unencumbered by an external supply hose, and designed with corrosion resistant materials, and in a manner that requires no tools for assembly or maintenance. This device has no moving parts when used for ordinary chopping. Only when thumb pressure is applied upon the hydraulic pump system do the shut-off and intake valves move slightly under the temporary pressure.

While only one particular embodiment of the axe has been set forth in detail, various modifications and changes may be made without departing from the scope of the invention. This one embodiment is set forth for illustrative purposes and is not intended to preclude other forms such as a differently shaped head, other handle or reservoir material and design, including possible use of removable fluid holding cartridges as reservoir fittings, an enlarged two hand version, or arrangements for filling the reservoir from a differently located exterior point, or different placement of an air vent into the hydraulic-reservoir fluid system.

I claim:

1. An axe for injecting a liquid chemical into the cambium layer zone of a tree, said axe comprising a head having converging surface portions defining a bit which terminates in a cutting edge, and a passage within said head having an outlet on each of said surfaces of the bit, a handle having a first hollow portion adapted to serve as a liquid reservoir, and a second portion secured to said head, and a hand operated flexible hydraulic pump carried by said handle, sealed fluid distribution means extending from the interior of said handle reservoir portion to said pump and from said pump to said axe head passage for drawing liquid from said reservoir and injecting said liquid through said head passage and into the cambium layer zone penetrated by said cutting edge.

2. An axe as set forth in claim 1, wherein said pump is flexibly detachable as a unit from said fluid distribution means for cleaning or filling the reservoir by use of finger pressure alone without recourse to tools.

3. An axe as set forth in claim 1, wherein said pump includes a compressible translucent bulb carried on said handle in position for direct thumb contact, said distribution means including a first valve between said pump and axe head passage adapted to open only upon compression of said pump, and a second valve located between the pump bulb and the intake end of said distribution means adapted to open upon release of said compression, whereby fluid can be drawn into said distribution means.

References Cited

UNITED STATES PATENTS

| 1,536,872 | 5/1925 | Bailey | 145—2 |
| 1,925,230 | 9/1933 | Buckhout | 128—231 |
| 2,846,817 | 8/1958 | Haislet | 47—57.5 |
| 2,853,833 | 9/1958 | Hash | 47—57.5 |
| 3,286,402 | 11/1966 | Newton | 47—57.5 |

FOREIGN PATENTS 1,097,644    1/1968    Great Britain.

ROBERT E. BAGWELL, Primary Examiner

U.S. Cl. X.R.

145—2; 21—73